United States Patent Office 2,975,102
Patented Mar. 14, 1961

2,975,102

TRANSPARENT JELLY-TYPE TOOTH-PASTE

Teruo Matsumura, Tokyo, Koichiro Iwasaki, Tachikawa City, and Seiichi Okumura, Musashino City, Japan, assignors to Raion Hamigaki Kabushiki Kaisha (Lion Dentifrice Co., Ltd.), Tokyo, Japan, a corporation of Japan No Drawing. Filed Feb. 26, 1957, Ser. No. 642,340

Claims priority, application Japan Mar. 1, 1956

8 Claims. (Cl. 167—93)

This invention relates to a method for preparing a new transparent tooth-paste and the new transparent tooth-paste prepared by said method. More particularly, this invention relates to the method for preparing a new transparent and form-retaining tooth-paste which comprises forming a basic material, i.e. a binder of said transparent tooth-paste, by neutralizing polyacrylic acid with an inorganic or organic alkali which will make said polyacrylic acid and aqueous soluble salt thereof, said inorganic or organic alkali including sodium hydroxide, potassium hydroxide, sodium carbonate, potassium carbonate, borax, triethanolamine, without adding any metallic salt which will make said water soluble alkali salt of polyacrylic acid a water insoluble salt, such as calcium carbonate, dicalcium phosphate, tricalcium phosphate, magnesium carbonate, aluminum silicate and other solid ingredients, adding foaming agent humectant such as glycerol, flavor and medical ingredient to said basic material, mixing and then deaerating the mixture thereof.

The tooth-paste obtained by this invention has a great foam volume and also the foam has a great stability when in use; furthermore it has superior cleansing power which makes this tooth-paste very efficient.

As the tooth-paste of this invention does not contain any multi-valent metallic salt, such as calcium salt, magnesium salt, aluminum salt, etc., a medical ingredient consisting of 2-4 alkali salt of EDTA which is apt to cause chelation with these metallic salts can be added to the tooth-paste in order to improve the medical effect of the same, i.e. to remove tartar, a cause of alveolar abscesses (alveolar pyorrhea).

Thus, the principal object of this invention is to provide a method for preparing a new transparent jelly-type tooth-paste having a great foam volume and stability of foam and also having superior cleansing power when in use, and the tooth-paste obtained by this method.

Another object of this invention is to provide a method for preparing a new transparent jelly-type tooth-paste which is harmless to the enamel portion of the tooth since it does not contain any solid ingredient such as calcium carbonate, and magnesium carbonate.

A further object of this invention is to provide a new method for preparing a new type transparent tooth-paste which can improve its medical effect by adding a 2–4 alkali salt of EDTA without any fear of losing its activity through chelation with a multi-valent metallic ion such as calcium ion, magnesium ion, and aluminum ion, and also to provide a new transparent tooth-paste effective in the prevention of an alveolar abscess (alveolar pyorrhea) since as explained above, a 2-4 alkali salt of EDTA, which is effective to remove tartar, a causative factor in the formation of alveolar abscesses, can be added therein.

Further object of this invention is to provide a method of preparing a new transparent tooth-paste which will not make clothes dirty even though it will be dropped on the clothes when in use, and whose residue can be easily removed from the interior of the mouth by gargling several times.

Another object of this invention is to provide a new jelly-type transparent tooth-paste prepared by the aforementioned methods.

Further object of this invention will be understood by the following descriptions:

Hitherto, two or three attempts have been made for preparing a tooth-paste by using an aqueous soluble salt of polyacrylic acid as a binder for tooth-paste by compounding it with calcium carbonate or some other solid ingredient. But the tooth-pastes prepared by the above methods have several disadvantages. When an aqueous soluble salt of polyacrylic acid exists together with an inorganic solid ingredient, the monovalent alkali salts of the polyacrylic acid react with multivalent metallic ions including divalent ions to form an insoluble calcium salt, magnesium salt or other salts thereof, resulting in a decrease in the viscosity of the binder, i.e. since the basic material of those inventions consists of the alkali-salts of polyacrylic acid, the resulting product has low binding power. The tooth-paste thus obtained is very soft and lacks power to keeping its form, with the result that the flavor, glycerol or water tend to separate at the top of the tube; consequently it is difficult to prepare an excellent product. Another disadvantage is, when a solid agent such as calcium carbonate is present, the foaming agent mixed in the tooth-paste is adsorbed on the surfaces of the solid ingredients, decreasing its effective concentration, diminishing the stability of the foam, lessening the penetrating and cleansing power. In other words, because of the existence of the solid agents, the use of a solution of alkali-salts of polyacrylic acid as a binder, lowers the efficiency of the product through loss of stability of the foam and the cleansing power thereof. Because of the decrease of the foam volume when in use, the medical effect obtained by the molecules of foaming agent and of medical ingredient in penetrating the surface and crevices of the teeth is decreased, and also there is no means to avoid harm to the surfaces of the teeth. Thus, in regard to the foaming volume, life of foam when in use, i.e. stability of the foam when in use, former tooth-pastes containing calcium carbonate are inferior in comparison to the new tooth-paste of the present invention.

Also, as explained above, since the older tooth-pastes contain a multivalent alkali salt such as calcium salt, magnesium salt, and aluminum salt, the 2-4 alkali salt of EDTA, which is effective in removing calculus and dirt from the teeth and in lightening the darkness of mottled teeth, cannot be added.

The above-mentioned several points indicate that it is desirable to eliminate solid ingredients from a tooth-paste which utilizes an aqueous solution of polyacrylic acid as a binder. However, the use of solid ingredients for tooth-paste has always been believed as a common sense procedure and no attempt was ever made prior to this invention to prepare a tooth-paste without solid ingredients.

The inventors, using an aqueous solution of an alkali salt of polyacrylic acid as a binder without adding any solid ingredient, then mixing flavor, foaming agent glycerol and medical agent to the above binder and deaerating by vacuum means under reduced pressure, eliminated said two disadvantages of former tooth-pastes, and succeeded in producing a transparent tooth-paste that positively utilizes the penetrating power of the tooth-paste to its full extent, giving great foam volume and having stability of the foam when in use, increasing medical effect, and, having considerable foam keeping power, coming out of the top of the tube as a ribbon shape.

When the transparent tooth-paste obtained according to this invention is properly applied by tooth-brush, the inner mouth will be cleaned by the cleansing power of its fully utilized foaming agent without fear of harming the surface of the teeth, since it uses only an aqueous solution of alkali-salt of polyacrylic acid as a binder without any solid ingredient such as calcium carbonate, magnesium carbonate, calcium phosphate, and aluminum silicate.

As a result of their studies on several binders, the inventors discovered that an aqueous solution of the alkali-salts of polyacrylic acid is superior for use as binder to be used for transparent jelly-type tooth-paste, for the following reasons: first of all, because the alkali-salt of polyacrylic acid is a synthetic material, it is uniform and stable; second, the aqueous solution thereof is transparent and contains none of the colloidal flocculences; third, it has a superior form-retaining power; lastly, it has appropriate viscosity.

The alkali to be used for preparing an aqueous solution of polyacrylate can be any alkali, whether organic or inorganic, if the said alkali is such as to form an aqueous solution. Such alkalis include, for example, sodium hydroxide, potassium hydroxide, sodium carbonate, potassium carbonate, borax and triethanolamine. However, in order to let said aqueous solution of polyacrylate have the desired viscosity, yielding value, and dispersibility within the mouth, it is most suitable to use as a binder, a solution combining the alkali salts of polyacrylic acid with one or more of the said alkalis.

For example, if the polyacrylic acid is dispersed in water, it will form a paste-like material, and if neutralized with alkali, it will form a transparent aqueous solution of alkali-salts of polyacrylic acid. If polyacrylic acid neutralized with sodium hydroxide is used, then a tooth-paste superior in form-retaining and hardness is obtained, but it has poor dispersibility within the mouth, and gives a feeling of sticking to the mucous membrane; also, it has a strong alkali smell.

The tooth-paste using borax as a neutralizing agent for polyacrylic acid has the disadvantage of being too soft and it is apt to run from the tooth-brush though it has a good point in its superior dispersibility in the mouth when in use.

The results of tests in regard to the rheological measuring value and the dispersibility of neutralized polyacrylic acid with alkali is shown in Table I below:

Table I

| Kind of alkalis used as a neutralizing agent | Yielding Value (dyne/cm.²) | Viscosity (poise) | Dispersibility in the mouth when used |
|---|---|---|---|
| Sodium hydroxide | 4,500 | 120 | Poor. |
| Borax | 3,000 | 100 | Excellent. |
| Sodium Carbonate | 4,000 | 100 | Good. |

As shown in the above Table I, yielding value, viscosity, and its dispersibility of the aqueous solution of alkali-salts of polyacrylic acid varies according to the kind of alkalis used as a neutralizing agent, it is desired to combine appropriately these alkalis in order to control the said yielding value, viscosity and its dispersibility in the mouth.

The preferred rate of combining alkalis shown by numerical value, for example, ratio of sodium hydroxide or sodium carbonate vs. borax, is approximately 3:1 to approximately 1:3.

The amount of alkali to be added is an amount sufficient to give the said polyacrylic acid resin a pH value of 7.0, by neutralizing it.

Formerly, in preparing a tooth-paste it was usual to add a medical agent, such as urea and vitamine K, and an antienzyme agent, such as lauroyl sarcosinate, sodium dehydroacetate, and a bactericidal agent such as furan compound. It is possible to add all the above-mentioned medical agents to the transparent jelly-type tooth-paste of this invention.

This invention is characterized by the fact that the 2-4 alkali-salts of EDTA, which could not be added to former tooth-pastes, can be added therein.

The effect of the 2-4 alkali-salts of EDTA in removing calculus and dirt from tooth and in lightening the brown part of a mottled tooth is already well-known in the pharmacological field by the results of many clinical tests. However, in mixing them to former tooth-pastes, they lose their activity when in use as of chelation with multi-valent ion such as calcium ion, magnesium ion, and aluminum ion, therein, thereby it is deemed difficult to use by mixing a 2-4 alkali-salt of EDTA to the former tooth-paste. On the other hand, the non-existence of said multi-valent ions to form insoluble salts in the transparent tooth-paste of this invention, permits the practice of adding 2-4 alkali-salts of EDTA with the result the effectiveness, the foaming nature, life (stability) of the foam, and the dispersibility in the mouth of the tooth-paste, are improved, and said tooth-paste of the present invention has superior medical effectiveness and cleansing power.

The preferred amount of a 2-4 alkali-salt of EDTA to be used for is 0.1–0.5% of the tooth-paste, however, this amount can be changed appropriately according to the purpose.

The foaming agents to be used for the tooth-paste of this invention may be either anionic surface active agents or non-ionic surface active agents. Typical examples are dioctyl sodium sulfosuccinate, sodium alkyl sulfoacetate, sulfocolamate, polyoxyethylene sorbitan alkyl ether, alkylolamide, alkylsulfate, alkylarylsulfonate, soap, etc.

The humectants to be used for preparing said tooth-paste of this invention are glycerol, sorbitol or any sort of glycol, the same agents used in former tooth-pastes.

Our invention is illustrated by the following examples. It is to be understood that these examples are by way of illustrations and should not be interpreted as limiting the scope of our invention.

The word "part" used in the following examples shows the part by weight, and if not specifically mentioned otherwise, the word "part" always shows part by weight.

EXAMPLE 1

Table II

| Ingredients: | Parts |
|---|---|
| Polyacrylic acid resin | 0.60 |
| Sodium hydroxide | 0.24 |
| Borax | 0.08 |
| Sodium laurylsulfate (foaming agent) | 0.8 |
| Sorbitol | 30.0 |
| Flavor | 1.5 |
| Sodium lauroylsarcosinate (anti-enzyme agent) | 0.05 |
| Saccharin | 0.1 |
| Water | 66.63 |
| | 100.00 |

The above ingredients are to be mixed in the amount stated above in order to prepare the new tooth-paste under invention. Detailed explanation is as follows; 0.6 part of polyacrylic acid resin is dispersed in 30 parts of water to form opaque aqueous dispersion of the polyacrylic acid resin. On the other hand, 0.24 part of sodium hydroxide and 0.8 part of borax are added and dissolved into the mixed solution of 30 parts of sorbitol and 30 parts of water to form the solution thereof. The obtained mixed solution was gradually added into said aqueous dispersion of polyacrylic acid resin with stirring and continued stirring for 60 minutes after adding.

The resulting solution was poured into a kneader, and a solution formed by adding 1.5 parts of flavor to a solution wherein 0.8 part of sodium laurylsulfate, 0.1 part of saccharin, 0.05 part of lauroyl sarcosinate were dissolved into 6.63 parts of water. Thereafter, the pressure of the kneader was reduced to 50 mm. Hg, and the mixture was stirred for 10 minutes at below 50 mm. Hg pressure. As a result, the said transparent jelly-type tooth-paste was obtained.

In order to compare the physical properties of the thus obtained new transparent jelly-type tooth-paste of this invention and the former type tooth-pastes, we prepared the former type tooth-paste in accordance with Table III below wherein the ingredients of tooth-paste of this invention is shown below for reference.

Table III

|  | Polyacrylic acid resin | Calcium carbonate | Foaming Agent | Flavor | Sorbitol |
|---|---|---|---|---|---|
| Former tooth-paste | 0.6 | 50.0 | 0.8 | 1.5 | 30.0 |
| Tooth-paste of this invention | 0.6 | None | 0.8 | 1.5 | 30.0 |

In regard to the former tooth-paste containing solid ingredients calcium carbonate and tooth-paste of this invention which is not containing the solid ingredients, we obtained the numerical value shown on Table IV below in the results of measuring their rheological property, form-retaining power and foaming volume.

Table IV

|  | Yielding value (dyne/cm.$^2$) | Viscosity (poise) | Foaming volume (cc.) | | Life (stability) of foam (min.) |
|---|---|---|---|---|---|
|  |  |  | Immediately after preparation | 2 months later |  |
| Former tooth-paste | 420 | 400 | 3 | 2 | 8 |
| Tooth-paste of this invention | 2,100 | 50 | 7 | 7 | 14 |

The method of measuring the foaming volume shown in Table IV is as follows:

Put 2 g. of testing material into a test tube providing a scale of 30 cc., add distilled water so as to reach to 20 cc., then shake it vigorously up and down 100 times, and calibrate the volume of foam obtained. The life of the foam described in said Table IV is measured immediately after the preparation. The yielding value shown in Table IV above, which shows the degree of form-retaining power of the tooth-paste, indicates how the former tooth-paste is soft and inclined to flow as a result of the decrease in the effect of the contained binder in accordance with the formation of calcium acrylate by the calcium carbonate being contained in the former tooth-paste. It also is clearly understood by checking the above Table IV that the tooth-paste of this invention is superior in its foam volume and stability of the foam when in use than former tooth-pastes containing calcium carbonate. In regard to foam volume, the tooth-paste of this invention shows no change 2 months after preparation, whereas the foam volume of the former tooth-pastes decreases in proportion to the length of time stored.

EXAMPLE 2

We prepared a transparent tooth-paste in accordance with the composition shown in Table V below, following the method of processing described in the above Example 1.

Table V

Ingredients: Parts
  Polyacrylic acid resin _____ 1.5
  Sodium hydroxide _____ 0.8
  Borax _____ 0.5
  Sodium lauryl benzenesulfonate (foaming agent) _____ 1.5
  Glycerol _____ 30.0
  Flavor _____ 1.5
  Sodium lauroylsarcosinate (anti-enzyme agent) _____ 0.05
  Water _____ 64.15
                                              _____
                                              100.00

EXAMPLE 3

We prepared a transparent tooth-paste in accordance with the composition shown in Table VI below, following the method of processing described in the above Example 1.

Table VI

Ingredients: Parts
  Polyacrylic acid resin _____ 2.0
  Anhydrous sodium carbonate _____ 1.5
  Borax _____ 1.0
  Sodium laurylsulfate (foaming agent) ____ 1.5
  Glycerol _____ 30.0
  Flavor _____ 1.5
  Sodium lauroylsarcosinate (anti-enzyme agent) _____ 0.05
  Saccharin _____ 0.1
  Water _____ 62.35
                                              _____
                                              100.00

EXAMPLE 4

Instead of the ingredients listed in Table VII below, we compiled with the same method in preparing new transparent jelly-type tooth-paste.

Table VII

Ingredients: Parts
  Polyacrylic acid resin _____ 5.0
  Anhydrous sodium carbonate _____ 2.7
  Borax _____ 2.0
  Sodium laurylsulfate (foaming agents) ___ 3.0
  Alcohol _____ 10.0
  Glycerol _____ 30.0
  Flavor _____ 1.5
  Sodium lauroylsarcosinate (anti-enzyme agent) _____ 0.05
  4 sodium EDTA _____ 0.1
  Water _____ 45.65
                                              _____
                                              100.00

The tooth-pastes obtained by following the above several methods, are all transparent and jelly-type and also have a great foaming power, stability of foam in use, and excellent cleansing power.

While the above method has been described, it will be understood that various modifications in details of procedure, operating conditions and concentrations of ingredients may be introduced without departure from the scope of the invention.

We claim:

1. A transparent jelly-type tooth-paste comprising an aqueous solution of an alkali salt of polyacrylic acid resin added as a binder to said tooth-paste, said binder prepared by neutralizing polyacrylic acid resin with an alkali forming with said polyacrylic acid resin a water soluble salt thereof, said tooth-paste being free from solid ingredients forming water insoluble salts of said polyacrylic acid resin.

2. A transparent jelly-type tooth-paste in accordance with claim 1 wherein the alkali is selected from the group consisting of sodium hydroxide, potassium hydroxide, sodium carbonate, borax, potassium carbonate and triethanolamine.

3. A transparent jelly-type tooth-paste in accordance with claim 1, containing from 0.5 to 5%, based on the weight of said aqueous solution, of the alkali salt of polyacrylic acid resin.

4. A transparent jelly-type tooth-paste according to claim 1 wherein the aqueous solution contains more than one alkali salt of polyacrylic acid resin.

5. A transparent jelly-type tooth-paste comprising as binder an aqueous solution of alkali salts of polyacrylic acid resin, prepared by neutralizing polyacrylic acid resin with at least two alkalis selected from the group consisting of sodium hydroxide, potassium hydroxide, sodium carbonate, potassium carbonate, borax and triethanolamine, and the 2,4-monovalent salt of EDTA.

6. A transparent jelly-type tooth-paste in accordance with claim 5 containing, in addition, a foaming agent, flavor, a humectant and a medical agent selected from the group consisting of urea, vitamin K, lauroyl sarcosinate sodium dehydroacetate and furan compound bactericide.

7. A method of preparing a transparent jelly-type tooth-paste, which comprises neutralizing polyacrylic acid resin with an alkali, forming with said polyacrylic acid resin a water soluble salt thereof, in an aqueous medium, and adding the aqueous solution of the alkali salt of polyacrylic acid resin formed to the tooth-paste as a binder for the tooth-paste.

8. A method of preparing transparent jelly-type tooth-paste, which comprises neutralizing polyacrylic acid resin with an alkali, selected from the group consisting of sodium hydroxide, potassium hydroxide, sodium carbonate, potassium carbonate, borax and triethanolamine, in an aqueous medium, and adding to the aqueous solution formed a foaming agent, flavor, a humectant, a medical agent, selected from the group consisting of urea, vitamin K, lauroyl sarcosinate, dehydroacetate and furan compound bactericide, and 2,4-monovalent alkali salt of EDTA.

References Cited in the file of this patent

UNITED STATES PATENTS

| | | |
|---|---|---|
| 2,200,709 | Trommsdorff | May 14, 1940 |
| 2,700,636 | Ashton | Jan. 25, 1955 |
| 2,749,274 | Buckwalter | June 5, 1956 |
| 2,772,203 | Salzmann | Nov. 27, 1956 |

FOREIGN PATENTS

| | | |
|---|---|---|
| 285,956 | Great Britain | Feb. 20, 1928 |
| 490,384 | Great Britain | Aug. 15, 1938 |
| 657,950 | Great Britain | Sept. 26, 1951 |
| 659,053 | Great Britain | Oct. 17, 1951 |
| 880,046 | Germany | June 18, 1953 |

OTHER REFERENCES

Gilman: "Organic Chemistry," 2nd ed., 1943, John Wiley and Sons, N.Y., vol. 1, pp. 750–752.